United States Patent [19]
Gentiluomo

[11] Patent Number: 4,802,671
[45] Date of Patent: Feb. 7, 1989

[54] BOWLING BALL

[76] Inventor: Joseph A. Gentiluomo, 1456 Belmont Ave., Schenectady, N.Y. 12308

[21] Appl. No.: 83,811

[22] Filed: Aug. 11, 1987

Related U.S. Application Data

[63] Continuation-in-part of Ser. No. 628,158, Jul. 5, 1984, which is a continuation-in-part of Ser. No. 171,897, Jul. 24, 1980, abandoned.

[51] Int. Cl.$^4$ ............................................. A63B 37/14
[52] U.S. Cl. ........................ 273/63 E; 273/DIG. 20; 273/DIG. 8
[58] Field of Search ................ 273/63 R, 63 D, 63 E, 273/63 A, 63 B, 63 C, 63 F, 63 G, DIG. 20, DIG. 8, 58 J, 58 A

[56] References Cited

U.S. PATENT DOCUMENTS

| | | | |
|---|---|---|---|
| 580,207 | 4/1897 | Boemermann et al. | 273/63 E |
| 3,256,018 | 6/1966 | Baggenstoss | 273/63 R |
| 3,400,929 | 9/1968 | Fabanich | 273/63 E |
| 3,467,605 | 9/1969 | Abercrombie et al. | 273/63 R |
| 4,131,277 | 12/1978 | Randolph | 273/63 D |
| 4,328,967 | 5/1982 | Orlando et al. | 273/63 D |
| 4,522,397 | 6/1985 | Miller et al. | 273/63 D |

Primary Examiner—George J. Marlo

[57] ABSTRACT

A bowling ball having a substantially large portion of the ball's weight concentrated toward the center of the ball, to form a bowling ball having a low moment of inertia. The ball comprises a solid inner core made from a mineral oxide such as lead oxide mixed with a binding resin such as polyester, an outer core surrounding the inner core and made from filled or unfilled elastomers such as polyurethane or polyester, and a low density syntactic foam cover encapsulating the outer core and made from polyurethane or other elastomers mixed with glass microballoons, and having a minimum Shore D hardness of 72 and a maximum specific gravity of 1. The inner core in conjunction with the outer core and cover has a calculated maximum moment of inertia of 0.184 in-ozs-sec$^2$ per pound of ball weight, for providing a substantially high total kinetic energy output. An additional increase in total kinetic energy output is obtained by the use of a high density annular top weight mass located closely around the inner core such that its lower surface is located at the midplane of the ball.

14 Claims, 1 Drawing Sheet

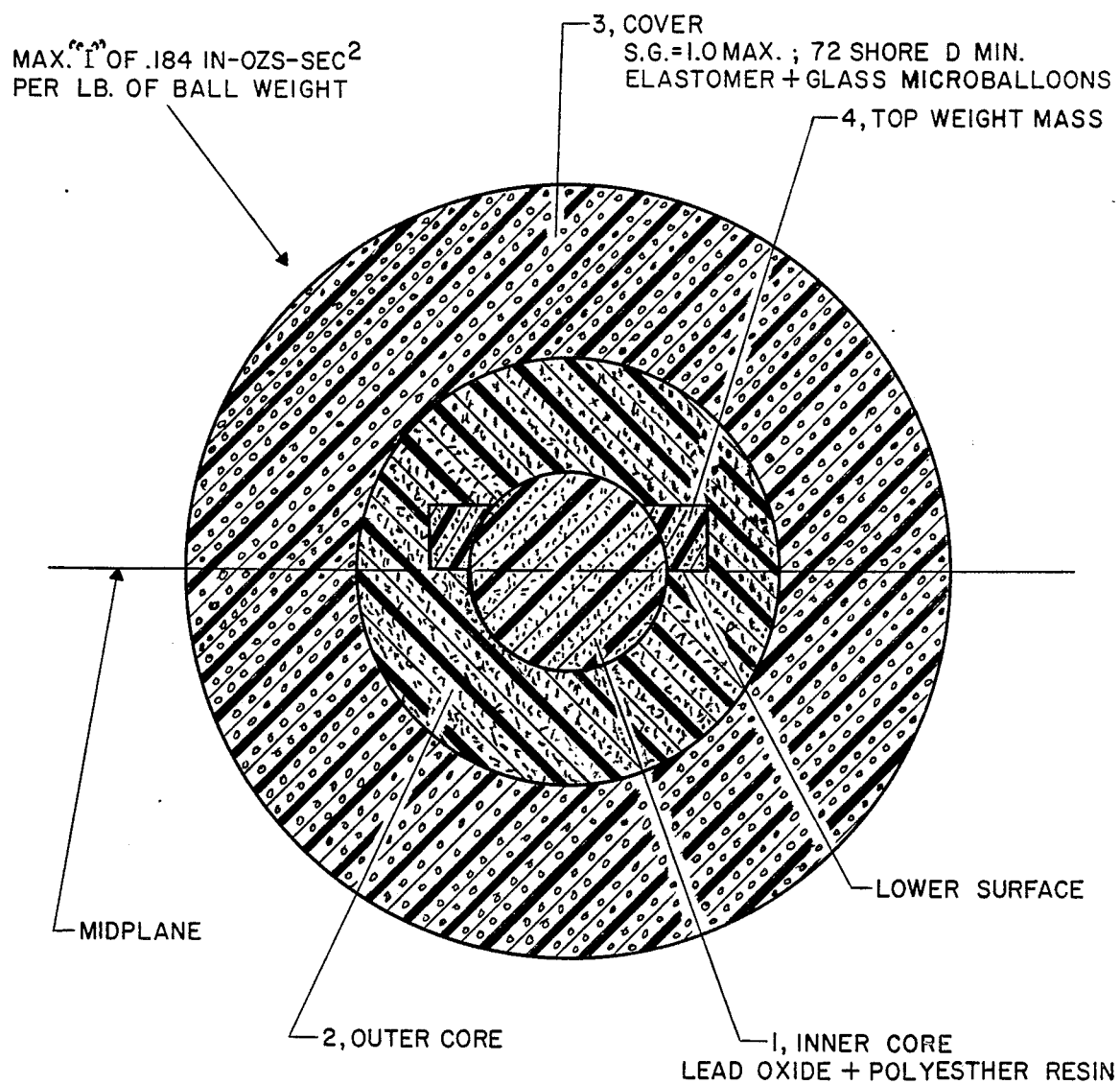

BOWLING BALL

This is a continuation-in-part of application Ser. No. 628,158 filed July 5, 1984, which in turn was a continuation-in-part of application Ser. No. 171,897 filed July 24, 1980 and now abandoned.

BACKGROUND OF THE INVENTION

The instant invention relates to bowling balls such as used in the game of tenpins, which can be manufactured to American Bowling Congress specifications.

A review of the prior art reveals that said art does not teach how to construct a bowling ball to provide the ultimate in ball hooking and driving action.

SUMMARY OF THE INVENTION

The intent of this invention is to provide a bowling ball having greater total kinetic energy output, by constructing the ball such that the combination of translational and rotational kinetic energies are greater than those of presently available balls. The increase in total kinetic energy is accomplished by decreasing the moment of inertia of a predetermined weight ball so that it can provide a greater output of work. It is to be noted that as the moment of inertia of a fixed weight ball is decreased, the translational kinetic energy increases and the rotational kinetic energy decreases. However, the translational kinetic energy increases at a greater rate than the rate at which the rotational kinetic energy decreases, thus resulting in an increase in total kinetic energy.

It is an advantageous feature of this invention to locate a large portion of the ball's weight toward the center of the ball. This weight distribution provides for a lower moment of inertia, a feature that is desirable when greater total kinetic energy output is desired. Greater total kinetic energy output will operate to provide for more ball hooking action, and more ball drive and mixing action when hitting the pins, than is obtainable with presently available bowling balls. By utilizing a syntactic foam cover, and a top weight mass located as close as possible around the high density inner core, the ball's kinetic energy output is further increased.

Ball moment of inertia in the instant invention is decreased when compared to a presently available bowling ball of equal weight, by design-wise removing weight from the outer portion of said presently available ball and by various means design-wise redistributing said removed weight to the innermost portion of the ball. Therefore, it is apparent that the main intent of this invention is to provide a high density inner core type bowling ball that has substantially improved operating characteristics.

To obtain a more thorough understanding of this invention, reference may be made to pending U.S. patent application Ser. No. 06/628,158 filed July 5, 1984.

Accordingly, objects of this invention are as follows:

To provide a ball having greater total output energy than a presently available ball, when delivered with the same linear and angular velocities.

To provide a ball having better ability to mix the pins, with less ball deflection, within a slippery pin deck area.

To provide a ball that develops additional hooking action, not initially imparted by the bowler.

These objects and other objects will become apparent when taken in conjunction with the description, claims, and accompanying drawing which depicts a sectional view through the middle of the bowling ball.

Terms herein used should bear interpretation such as disclosed in the patent application and cited supra.

DESCRIPTION OF THE INVENTION

Generally, the bowling ball illustrated in the drawing comprises a spherical high density solid inner core having its center substantially coincident with the ball's geometrical center, and of such diameter that thumb and finger holes cannot be drilled therein. Surrounding the inner core is an outer core having an annular top weight mass located therein. The top weight mass is disposed closely around the inner core, with its lower surface located at the midplane of the inner core. It should be noted that the annular top weight mass, which is used to offset the loss of weight resulting from drilling the thumb and finger holes and to provide for the inclusion of the maximum ABC allowable 3 ounce out-of-balance permitted between the top and bottom of the ball, is placed as close to the inner core as possible in order to assist toward further decreasing the moment of inertia of the ball over and above the reduction obtained through use of the high density inner core taken alone. The top weight mass may be manufactured integral with the inner core, or as a separate piece closely fitted around the inner core. It should be further noted that the bowling ball of this invention can be made to include the conventional top weight block located toward the surface of the ball, or the high density annular top weight mass herein described. Also, to assist toward decreasing the ball's moment of inertia, a rigid elastomer foam cover is used. The elastomer foam may be of the blown resin foaming type, or of the low density syntactic foam type. Rigid blown polyurethane foams are available with a Shore D Durometer hardness of 73. It should be noted that non-foamed rigid thermosetting elastomers with a minimum Durometer hardness of 72 Shore D, cannot be obtained with specific gravities below approximately 1.04. Low density syntactic foams of epoxy, polyester, polyurethane, etc., can be readily formulated with a minimum Shore D hardness of 72.

The preferred embodiment of this invention includes a spherical solid inner core 1 made from a mineral oxide such as lead oxide mixed with a binding resin such as polyester. Also, the annular top weight mass 4, located within the top portion of the ball above the ball's midplane, can be made of the same material used for inner core 1. Surrounding inner core 1 and top weight mass 4, is solid molded outer core 2. Outer core 2 can be made from filled or unfilled elastomers such as polyurethane, polyester, etc. Encapsulating outer core 2, is a low density syntactic foam cover 3 made from polyurethane or other elastomers, mixed with a density reducing filler such as glass microballoons, and having a minimum Shore D Durometer hardness of 72 with a specific gravity of less than 1.04 and preferably 1.0 or less. Manufacture of the ball is achieved by means disclosed in pending patent application cited supra, and also by means well known in the art.

In bowling balls of the instant invention, the weights of the inner core 1, outer core 2, and cover 3 may be varied through use of materials of preselected densities, for the purpose of manufacturing balls having moments of inertia lower than presently available bowling balls.

In order that this invention may be more fully understood, the following data for determining the calculated moment of inertia of a three piece 16 pound ball is presented.

(1) Inner Core: (PBo+Polyester Binder)

$d_1 = 2.0''$

S.G. = 8.4

$w_1 = 0.3035$ #/in$^3$ or 524.412 #/ft$^3$ (2) Outer Core:

$d_2 = 4.595''$ $w_2 = ?$ (3) Cover: (Polyurethane+Glass Microballoons)

$d_3 = 8.595''$

S.G. = 0.6

$w_3 = 0.0217$ #/in$^3$ or 37.458 #/ft$^3$

Based on formulas presented in pending patent application cited supra, which are well known in the art, the density of the outer core and the moment of inertia of the ball were determined using above presented data. The outer core density calculated to $w_2 = 0.1849$ #/in$^3$, the ball moment of inertia calculated to "I" = 2.938 in-ozs-sec$^2$, and the moment of inertia per pound of ball weight calculated to 0.184 in-ozs-sec$^2$. These values were obtained based on a ball having only an inner core, an outer core, and a cover. The annular top weight mass was not included in the calculations. Inclusion of the top weight mass into the calculations would further decrease the above cited value of 0.184 in-ozs-sec$^2$ per pound of ball weight.

The following represents calculations for determining the calculated moment of inertia, using above presented data.

$$w_2 = \frac{.0217(8.595^3 - 4.595^3) + .3035(2)^3 - 1.91 \times 16}{(2)^3 - (4.595)^3}$$

$w_2 = .1849$ #/in$^3$   S.G. = 5.117   $w_2 = 319.48$ #/ft$^3$ $$I = \frac{8}{15 \times 32.2} [524.412(.0833)^5 + 319.48(.1915^5 - .0833^5) + 37.458(.358^5 - .192^5)]$$

$I = .0153$ ft-lbs-sec$^2$ or 2.938 in-ozs-sec$^2$ $$\frac{I}{W} = \frac{2.938}{16} = .184 \text{ in-ozs-sec}^2 \text{ per pound of ball weight}$$

It should be noted that the "Table" presented in the pending application cited supra, shows that the minimum moment of inertia value for a 16 pound ball is 4.195 in-ozs-sec$^2$. By comparison, it should be noted that the calculated moment of inertia of 2.938 in-ozs-sec$^2$ of the instant invention is substantially less. Therefore, it becomes apparent that the use of a low density syntactic foam cover has a pronounced effect on reducing the moment of inertia of the ball to effectuate an increase in total kinetic energy output.

Having thusly described the invention, the following is claimed:

1. A bowling ball comprising:
   (a) an inner core having its center substantially coincident with the geometrical center of said bowling ball;
   (b) a solid outer core surrounding said inner core;
   (c) and a rigid elastomer foam cover surrounding said outer core, and having a minimum Shore D Durometer hardness of 72 and a maximum specific gravity of 1.

2. The bowling ball defined in claim 1, wherein said rigid elastomer foam is further characterized as a syntactic foam consisting of an elastomer having a density reducing filler mixed throughout said ball's cover thickness for the purpose of decreasing ball moment of inertia.

3. The bowling ball defined in claim 2, wherein said density reducing filler is further characterized as glass microballoons.

4. The bowling ball defined in claim 3, wherein said inner core is further characterized as being made from lead oxide mixed with a binding resin.

5. The bowling ball defined in claim 4, wherein said binding resin is further characterized as polyester.

6. The bowling ball defined in claim 5, further characterized as having a top weight mass located within said outer core.

7. The bowling ball defined in claim 6, wherein said top weight mass is further characterized as being annular in shape, and located closely around said inner core with its lower surface at the midplane of said ball.

8. A bowling ball comprising:
   (a) an inner core having its center substantially coincident with the geometrical center of said bowling ball;
   (b) a solid outer core surrounding said inner core;
   (c) and a rigid elastomer foam cover surrounding said outer core, and having a minimum Shore D Durometer hardness of 72;
   (d) said inner core in conjunction with said outer core and said cover, provide a calculated maximum moment of inertia of 0.184 in-ozs-sec$^2$ per pound of ball weight.

9. The bowling ball defined in claim 8, wherein said rigid elastomer foam is further characterized as a syntactic foam consisting of an elastomer mixed with a density reducing filler.

10. The bowling ball defined in claim 9, wherein said density reducing filler is further characterized as glass microballoons.

11. The bowling ball defined in claim 10, wherein said inner core is further characterized as being made from lead oxide mixed with a binding resin.

12. The bowling ball defined in claim 11, wherein said binding resin is further characterized as polyester.

13. The bowling ball defined in claim 12, further characterized as having a top weight mass located within said outer core.

14. The bowling ball defined in claim 13, wherein said top weight mass is further characterized as being annular in shape, and located closely around said inner core with its lower surface at the midplane of the ball.

* * * * *